FIG III.
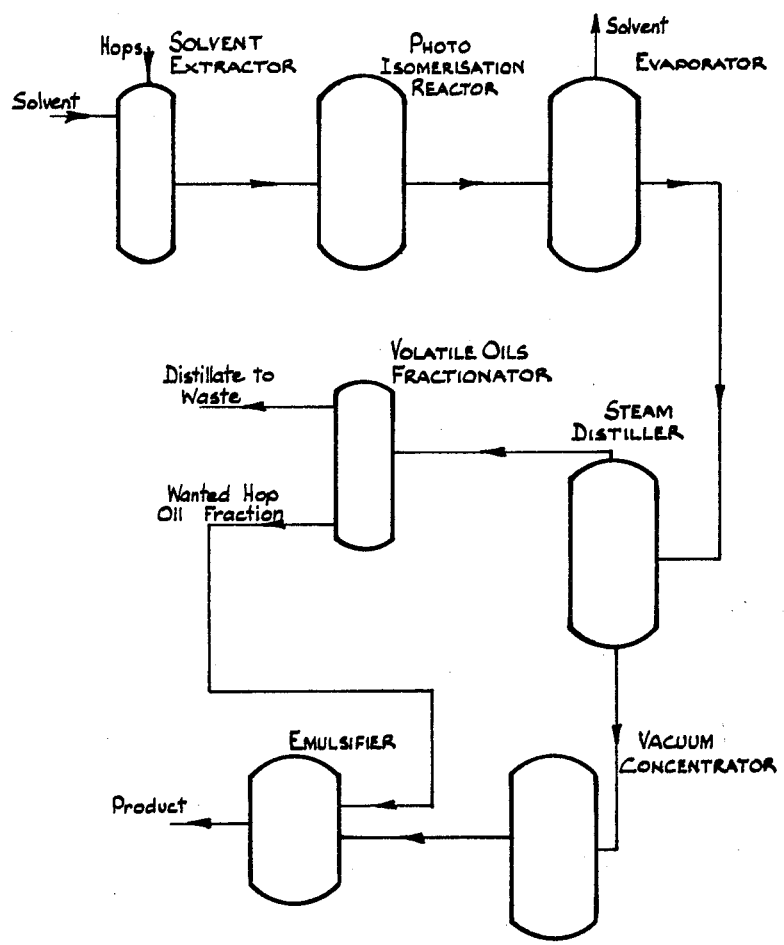

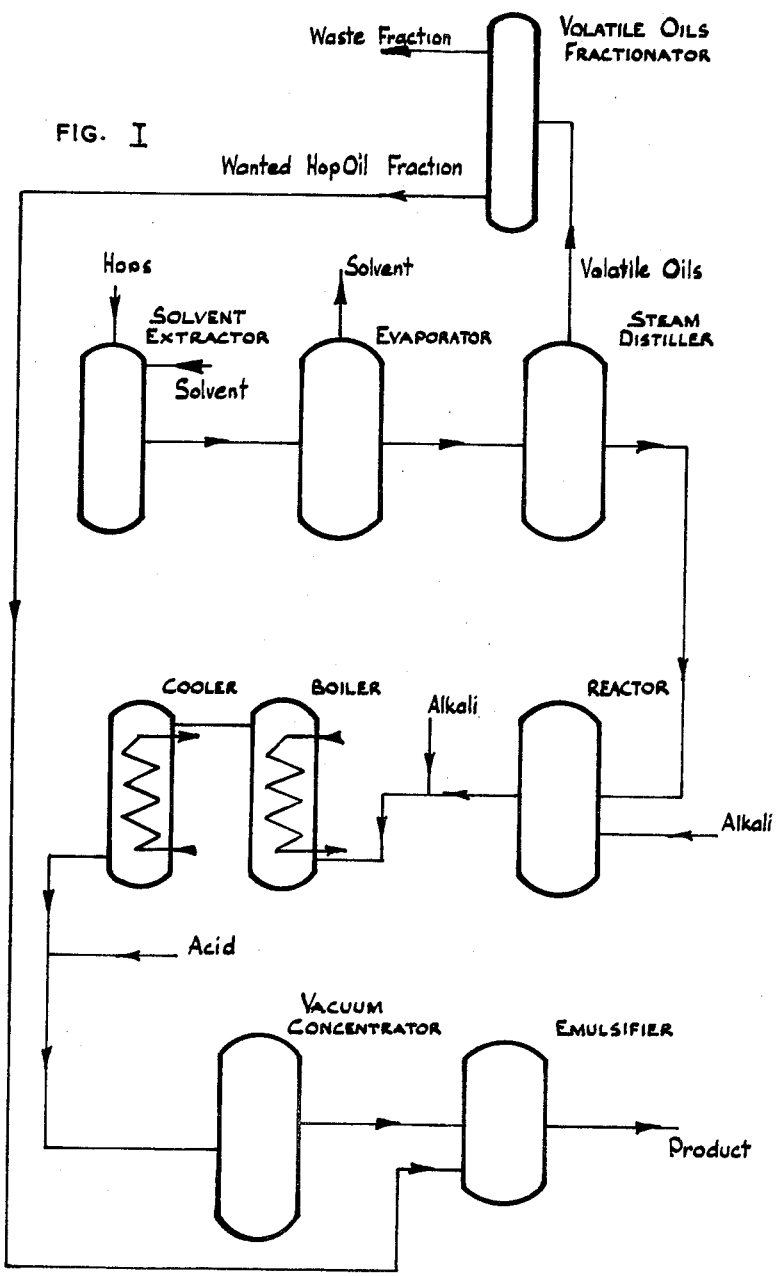

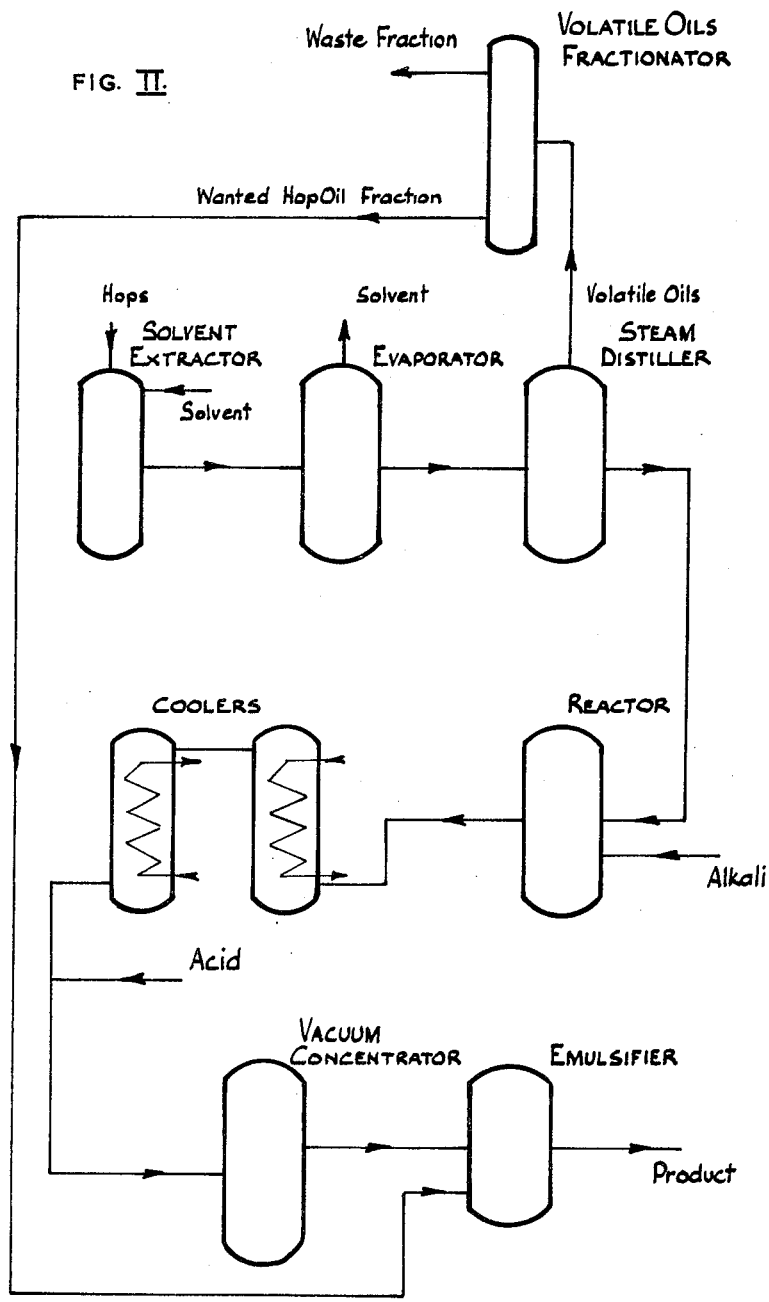
FIG. II.

3,155,522
PROCESS FOR THE PRODUCTION OF A HOP CONCENTRATE
Robert Peter Hildebrand, Mount Waverley, Victoria, Frank Vincent Harold, South Caulfield, Victoria, Brian James Clarke, St. Kilda, Victoria, and Peter John Andrew Murray, East Malvern, Victoria, Australia, assignors to Carlton and United Breweries Limited, Carlton, Victoria, Australia, a corporation of Victoria
Filed June 28, 1962, Ser. No. 206,000
Claims priority, application Australia July 4, 1961
10 Claims. (Cl. 99—50.5)

This invention relates to the preparation of hop concentrates or extracts for brewing purposes, and to the production of hopped beverages, such as beer, utilizing such concentrates.

An object of this invention is to provide a new process for the manufacture of hop concentrates which if used to replace hops will impart to the finished beer in their correct balance those materials contributing to taste characteristics and flavour which are normally found in beer manufactured by conventional processes. A further object is to enable economies to be effected in the manufacture of beer or like beverages.

While the invention applies to the treatment of any part of the hop plant it refers in particular to the hop cones, and the hops used may be either in the freshly picked state or dried as in normal commercial practice.

Processes for the preparation of some types of hop extracts are known, but these have not been commercially successful, mainly for the following reasons:

(a) These processes have achieved little economy in hop usage as they have merely been used to replace hops in the boiling kettle. During boiling of the hops with the wort, the alpha acids or humulones present in the hops are converted to their iso forms which constitute a major portion of the final bittering material in beer. Regardless of whether hops or conventional hop extracts are used, a substantial proportion (e.g. 40–50%) of these materials are lost during wort boiling and subsequent processing by adsorption onto coagulated protein and by other means.

While it has been claimed previously that certain economies can be achieved by using conventional hop extracts, these have only applied with high hop rates where hop utilization has been poor. In these cases, almost equivalent economies could be made by better hop utilization along conventional lines, and the economies claimed do not apply in cases where hop utilization is at or about the maximum. The present process is believed to effect economies over and above those achieved by maximum utilization of hops along conventional lines.

(b) Most conventional hop extracts also contain the total oil extracted from the hops, and in using such hop extracts it is necessary to rely on the wort boiling to remove undesirable components. Other conventional hop extracts from which all the oil has been removed require to be added to the boiling wort to convert the humulones to their iso forms.

In the former case hop economy is little better than that achieved by conventional hopping at the rate of maximum utilization. In addition beer produced by the use of the said extracts lack hop character due to the greater loss of hop essential oil by steam distillation. This is believed to result from the presentation of the oil to the boiling wort as discrete globules rather than confined in plant cellular tissue as in natural hops. Further, such extracts may develop a rancid taste due to the hydrolysis of hop esters during storage.

In the latter case, beers made with such extracts are substantially devoid of true hop character, and also hop economy is little better than that achieved by conventional hopping at the rate of maximum utilization.

In our experiments we have made certain discoveries in regard to the components of hop oil which are normally present in beer, and in regard to the amounts of such components which are present in beer, and we have made use of this information, in addition to other information obtained from our experiments, in the provision of a process for the manufacture of a properly balanced hop concentrate according to this invention.

Of the various groups of compounds present in the hop cone the three which have long been recognized as of importance in brewing are the resins, the tannins and the essential oils. Other constituents which although of relatively little importance in normal brewing may demand consideration in the preparation of hop extracts are the pectins, hop waxes and water.

The compounds which constitute the essential oil fraction of the hop are of direct importance in that they contribute in varying degrees to that final facet of beer flavour known as "hop character."

The tannins of the hop combine readily with protein during normal kettle boiling and the resulting protein-tannin compounds make up the so-called "hot" and "cold" breaks of cast wort. The tannins not precipitated during wort boiling or subsequent fermentation and storage contribute to haze formation in the finished beer.

The hop resins are normally divided into two classes, viz., soft and hard resins, all the resins of brewing importance being amongst the soft resins. The two principal groups of soft resins are the humulones or acids and the lupulones or $\alpha$-acids. By chemical transformation the humulones are converted during kettle boiling into isohumulones which contribute directly to, and constitute a major part of, the bitterness of beer. The lupulones on the other hand, due mainly to their low solubility in water, do not contribute directly to hop flavour under normal brewing conditions.

Of the other groups, the pectins are believed to have an improving effect on beer stability while the presence of waxes and water has an important effect on the choice of extraction and isomerization conditions and the subsequent stability of the extract since hop wax is known to affect the rate of decay of $\alpha$-acids. Further, in our experiments we have shown that hop wax is present in beer made by conventional processes and that this is undesirable.

Our invention may be generally described as a process for the production of a hop concentrate for use in the manufacture of a hopped beverage which includes the steps:

(a) Extracting hops by refluxing with an organic solvent selected from the group consisting of petroleum fractions of boiling range between 40° C. and 60° C. and trichloroethylene, to form a crude hop-extract;

(b) Evaporating off all the solvent under vacuum to obtain a crude hop concentrate;

(c) Separating the total volatile-oil content of the hops from the non-volatile resins by steam distilling the crude hop concentrate with live steam to remove said oils from said resins and retaining said oils and said resin residue;

(d) Subjecting the total hop-oils obtained from step (c) to vacuum fractional distillation to remove therefrom low boiling esters or carbonyl compounds and hydrocarbons which give rise to an undesirable taste or "off" flavours in beer and collecting the remaining fractions of the hop oil consisting of terpene and sesqui-terpene type materials which possess a taste characteristic suitable for flavouring and for bittering of beer;

(e) Isomerizing the humulones of hop-resins by adding alkali to the resin residue of the steam distillation and heating, or by subjecting the hop extract to electro-magnetic radiation, said alkali being either dilute sodium hydroxide or sodium carbonate solution, and when adding sodium hydroxide, adding a dilute sodium hydroxide solution continuously to the residue from steam distillation while flowing said residue through alternate zones of heating and chilling to ensure a minimal residence time of the heat sensitive humulones of the hop resin in the heating zone, thereby preventing decomposition of the humulones, or when adding sodium carbonate adding the same in the form of a dilute solution to the residue from the steam distillation and refluxing for a time insufficient to decompose the humulones;

(f) Concentrating the isomerized resin phase by vacuum distillation to produce an isomerized hop-resin concentrate;

(g) Blending the selected hop-oil fractions collected from the fractional distillation of the total hop oils, with the isomerized hop resin concentrate to produce a blended hop concentrate final product, such product being specifically designed for addition subsequent to wort boiling either prior to fermentation or to the fermented and matured beer prior to final filtration.

In the solvent extractions of the hops, any of a number of neutral solvents may be used e.g. low boiling petroleum fractions and trichloroethylene. The choice of solvent depends on the compositions required in the resulting extract. Extraction may be carried out using hot or cold conditions providing that an inert atmosphere is used and the temperature is not allowed at any stage to exceed 50° C., except that if it is desired to eliminate hop wax from the extract cold solvent must be used.

The invention includes removal of the solvent either under vacuum in a thin-layer type evaporator or its equivalent. In the case of the thin-layer evaporator the vacuum under which solvent removal is carried out is so adjusted that the solvent used for extraction is removed at temperatures very close to ambient with minimal residence in the heated zone. These conditions are necessary to prevent any destruction of the humulones.

The concentrate obtained contains the resinous material of the hop cone, both soft and hard, the quantity of hard resin varying with the extracting solvent used. The amount of tannin in the concentrate will also depend on the solvent used, the amount extracted being relatively low in the presence of a non-polar solvent. Except for small amounts of the low boiling components which are lost in the evaporation procedure the concentrate will in all cases contain the total essential oils from the hop cone.

In regard to the removal of the undesirable hop oil components, it is pointed out that the oxygenated fraction of hop oil which includes esters and carbonyl compounds can influence beer flavors at a lower concentration than the hydrocarbon fraction, but with the exception of methylnonyl ketone, the iso-butyl ester of racemic 2-methyl butanol, and possibly a pelargonate ester, none of the components of this fraction have been effectively identified. The various esters, however, which occur in this fraction, will, if allowed to remain in the hop extract gradually give rise to "off" flavors, and in some case rancid flavors, by hydrolysis. Certain components of the hydrocarbon fractions also, in particular myrcene, have a pronounced flavor and if present in beer at concentration greater than 0.1 p.p.m. will impart a pronounced and undesirable taste and aroma.

On the other hand we have found that certain hop oil components are necessary in the hop extract to impart so-called "hop character." While a number of these compounds are as yet unidentified in the chemical sense they are not uncharacterized, and their presence can be analytically detected by gas chromatography.

The process for the production of the hop concentrate is more fully described with reference to the accompanying drawings in which FIGURES 1 to 3 inclusive are schematic bow charts illustrating different embodiments of the process according to the present invention, and FIGURE 1 is a flow chart illustrating a continuous process for the production of a hop concentrate wherein two stage addition of alkali is employed in the isomerization step;

FIGURE 2 is a flow chart illustrating a batch process for production of hop concentrate wherein single stage addition of alkali is employed in the isomerization step, and FIGURE 3 is a flow chart illustrating a modification of the process for production of hop concentrate wherein photochemical means are employed for performing the isomerization step.

Referring to the continuous process illustrated schematically in FIGURE 1 of the drawings, hops and a suitable solvent were introduced to the solvent extractor, and the crude hop extract is passed to the evaporator where it is concentrated by evaporation of the solvent. The crude hop concentrate is transferred to the steam distiller where steam distillation is carried out to separate the volatile hop oils from the non-volatile hop resins. The volatile hop oils are subjected to fractional distillation in the fractionator to separate the previously defined desirable hop oil fraction from the undesirable or waste fraction. The desirable hop oil fraction is transferred to the emulsifier where it is emulsified with the isomerized hop resin concentrate produced as described below. The hop resin residue from the steam distiller is transferred to a reactor in which it is treated with alkali (e.g. caustic soda) and is then subjected to isomerization by further treatment with alkali prior to heating in the boiler or heated zone. The residue is then chilled in the cooler and the alkali is neutralized with acid. The isomerized hop resin extract produced is then concentrated in the vacuum concentrator, and the hop resin concentrate formed is transferred to the emulsifier where it is emulsified with the hop oil fraction previously mentioned to produce the hop concentrate final product.

In FIGURE 2, in which a batch process is schematically illustrated, the steps are similar to those described above with reference to FIGURE 1 except for the isomerization procedure. In the batch process, there is a single stage addition of alkali (e.g. sodium carbonate) in the reactor, and the isomerized resin extract is chilled in the coolers and is then neutralized with acid, concentrated in the vacuum concentrator, and finally emulsified with the hop oil fraction.

In FIGURE 3, in which a process employing photochemical isomerization is schematically illustrated, the hop extract from the solvent extraction is transferred to the photo isomerization reactor wherein the said extract is exposed to electromagnetic radiation (as hereinafter more fully described) to isomerize the inactive hop resins. The isomerized extract is then concentrated in the evaporator, and the concentrate is then steam distilled in the steam distiller to remove the volatile hop oils, and these are then fractionated in the fractionator to separate the wanted hop oil fraction which is transferred to the emulsifier. The residue from the steam distiller is concentrated in the vacuum concentrator and the concentrate formed is passed to the emulsifier where it is emulsified with the hop oil fraction to form the hop concentrate final product.

In one practical form of the invention, the hop extract is completely freed of hop oil by the direct introduction of live steam to the steam distillation vessel which is itself preferably at 20–30 mm. of mercury above absolute zero pressure. Under these conditions the extract is submitted to temperature of the order of 15–30° C. under conditions of steam distillation for a period of four hours or other such period as may be found necessary in order to completely remove the hop oil and depending upon the characteristics of the particular vessel.

The hop oil is separated from the steam distillate, and, after drying, divided into two fractions by distillation, under a fractionating column of 40 theoretical plates at 100 mm. of mercury pressure. The fraction boiling above 100° C. at 100 mm. is then resubmitted to fractionation at 10 mm. of mercury pressure under the column described previously and the distillation continued until a continuously monitoring gas liquid chromatograph indicates that the relative proportion of hop oil components one to the other in the pot approach that found to be present in beer brewed by conventional processes. This offers no difficulty as the lower boiling hop oil components pass into the distillate first and these same components are those normally lost during kettle boiling. By combining certain portions of the distillate with the pot residue the hop character of beer can be altered at will. A portion of this oil, see later, is emulsified with the resin extract and used as a hop concentrate for addition to production brews.

Isomerization of the hop resin residue of the steam distillation can be achieved by treating the resin residue with an alkali such as sodium carbonate, or sodium hydroxide or by exposing the hop resin residue to electromagnetic radiation, e.g. to the action of light preferably under an inert atmosphere. In one example of alkaline isomerization, sodium carbonate and/or concentrated sodium carbonate solution is added to the refluxing aqueous suspension of the extract to a pH of the order of 7 to 8 on the pH scale is attained. The solution is boiled with further 10% sodium carbonate solution until the pH is between 8 and 11 on the pH scale, with the proviso that sufficient alkali is added to convert the humulone completely to the di-anion. Boiling under a reflux condenser is continued for fifteen minutes at the end of which time the solution is chilled by passage through brine coils and the pH adjusted to between 5 and 7 on the pH scale by addition of dilute mineral acid.

In an example of alkaline isomerization sodium hydroxide is added to the hop resin residue of steam distillation in a two stage addition. To a reactor containing the hop resin residue, preboiled and cold 0.25% sodium hydroxide solution is added until the pH of the solution in the reactor is of the order of 8 to 9 on the pH scale. A valve at the bottom of the reactor is then opened and the solution allowed to flow through a heated zone which is maintained at a temperature of approximately 105° C., and a chilled zone maintained at a temperature of approximately 5° C. Immediately prior to entry of the solution to the heated zone, further 0.25% sodium hydroxide solution is added until the pH is of the order to 10–12 in the pH scale, with the proviso that sufficient alkali is added to convert humulone completely to the di-anion. The pH is continuously adjusted on the flowing steam. The rate of flow from the reactor is so adjusted that the residence time of the liquid in the heating zone is of the order of four minutes, though this is an individual characteristic of any particular plant. After passage through the heating zone the solution is immediately chilled to 5° C. by passage through the chilled zone and immediately following this the pH is again adjusted continuously to between 5–7 on the pH scale.

Referring to the process utilizing photochemical isomerization, the hop extract may be isomerized by exposure to electro-magnetic radiation in the visible region of the spectrum, i.e. radiation having a wave-length between 3660 and 7000 Angstrom units, though in this case the extract must be substantially chlorophyll free.

In one example, 50 lbs. hops, of α-acid content 6.4% by weight, were intimately mixed with 4 lbs. of activated carbon (which has previously been treated with sulphur dioxide to eliminate free oxygen) and then extracted with light petrol (boiling between 40 and 60° C.) at 10° C. Removal of the solvent, as previously described, yielded 7.65 lbs. by weight of extract which contained 3.21 lbs. by weight of α-acid as measured by standard techniques.

The extract was steam distilled to remove the oil, as described previously, and the steam distilled residue again taken into light petrol, using a counter-current separator or other similar device, and maintained under an inert atmosphere.

While the very variable efficiency of optical systems, the variable number of such sources as well as the optical quality of the glass used make it impossible to state accurately the time of exposure to radiation necessary to bring about isomerization, a particular case may be cited. For example, in this case 20 gallons of a mixture of light petrol and hop extract was placed in a Pyrex glass reaction vessel (limit of transmission 3000 A.) and exposed to a battery of tungsten filament lamps operating at a colour temperature of 3400° K. for four hours. Examination of the extract at the end of this period indicated that the isomerization was complete.

A modification of this apparatus involves continuous flow of the extract through an annular space in the centre of which are fitted a series of specially designed discharge tubes emitting radiation at 3660 Angstrom units and above. The residence time in the annual space is controlled by an ultra-violet spectrophotometer which continually monitors the discharging isomerized extract.

Isomerization can also be achieved by using sunlight under appropriate condition. Soda or soft glass, with a lower transmission limit at 3500 A. is quite satisfactory as a reaction vessel.

According to a further modification of the invention, the isomerized extract prepared by any of the above techniques may be directly emulsified with the desired hop oil fraction as previously detailed or first concentrated in vacuo to remove excess water and/or solvent prior to emulsification.

The isomerized extract may be added to the cast wort after cooling and prior to pitching, or alternatively if it is desired to avoid loss of iso-humulones in the yeast head, it may be added after fermentation and removal of the yeast. In the latter case the hop oil is added as a separate entity, dispersed in protein such as gelatin or a substance with similar dispersion characteristics such as alginic acid, prior to fermentation.

If it is desired to make a very stable beer the extract can be treated in such a manner as to remove the particular anthocyanogene contributed from hops and responsible in part for beer haze by methods already being applied to remove such materials from beer, by filtration through nylon, or by treatment with polyvinyl pyrrolidone, or by the selection of a particular solvent for the initial extraction such as low boiling petroleum fractions or benzene in which such materials are not soluble and are thus not carried into the extract.

In one typical form of the invention, hops are extracted with low boiling point solvent in an inert atmosphere either in the hot or cold, but under such conditions that the temperature does not at any stage exceed 50° C.

The extract is concentrated by removal of the solvent under vacuum by means of any commercially available thin layer evaporator or its equivalent which can be manipulated so that residence time in the heated zone is minimal and that the temperature of the heated zone is not in excess of 65° C., such conditions being essential to prevent any destruction of the humulones.

In an example of the batch process 54 lbs. of hops containing 8.7% of α-acid, and 8.5% of moisture, were extracted with methanol at 20° C., in several stages and in an inert atmosphere of carbon dioxide. The extract was chilled and the precipitated hop wax was removed by filtration. Removal of the solvent through a commercial thin layer evaporator at the rate of 40 gallons per hour left an oily residue of 18.3 lbs., which contained some water. Analysis indicated complete extraction and recovery of the humulones.

The isolated hop resins were freed of essential oil by vacuum steam distillation, either by the direct injection of live oxygen-free steam or by boiling with pre-boiled water under an oil trap with cohobation.

Then, 18.3 lbs. of hop extract obtained as above, was diluted with 50 gallons of boiled out water, and then steam distilled at 5 mm. of mercury absolute by the direct injection of live oxygen-free steam to yield approximately 0.48 lb. of oil. Analysis of the residue indicated that basically all the oil had been removed.

Oil, isolated as above, was fractionated under reduced pressure and the appropriate portion of the oil collected as previously described for subsequent addition to the beer.

In this way 0.27 lb. of oil were obtained as the pot residue from a 40 plate column used with a reflux ratio of 10. The pot residue was essentially free of low boiling esters, but contained approximately 10% of myrcene and other monoterpenoids as indicated by gas chromatography. Two ounces (0.125 lb.) of the pot residue which constitutes essentially the sesquiterpenoid fraction was added to the isomerized extract (see later), and emulsified.

Isomerization of the extract was achieved by adding solid sodium carbonate until the aqueous phase was approximately 2 normal with respect to sodium carbonate and the aqueous solution further diluted with preboiled 2 normal aqueous sodium carbonate solution to a predetermined pH, of the order of 11 on the pH scale. This solution was then refluxed for 5 minutes and immediately chilled by standard methods and neutralized with mineral acid.

In order to carry out the isomerization, 58 lbs. of sodium carbonate was added to 55 gallons of the extract suspension until the aqueous phase was 2 normal with respect to sodium carbonate, and a further 18.5 gallons of boiling 2 normal sodium carbonate solution then added.

The solution was refluxed for 5 minutes in an inert atmosphere and immediately chilled by passage through brine coils. This was followed by neutralization with hydrochloric acid. Analysis of the isomerized hop extract indicated an 80% conversion of humulones to isohumulones. 74 gallons of the isomerized hop extract was then taken and emulsified with 0.012 lb. of the sesquiterpenoid fraction of hop oil to produce the hop concentrate final product. This was added to cold bright sweet wort, 200 hhds, and dispersed by agitation.

Analysis of the wort prior to fermentation indicated an iso-humulone content of 30 p.p.m. arising from an extraction of 54 lbs. of hops.

Isomerization of hop extract can alternatively be achieved by a continuous process involving a two stage addition of alkali. In the first alkali addition one-tenth normal sodium hydroxide solution is added to a pH such that destruction of the humulones in the extract does not occur on standing at 5° C. under an inert atmosphere such as nitrogen or carbon dioxide. The alkali extract solution is then provided with suitable isomerizing conditions by further alkali additions immediately prior to passage through a heated zone, the residence time in such heated zone being arranged to give an 80% conversion of humulones to isohumulones and being of the order of three minutes. Passage through the heated zone is immediately followed by passage through a chilled zone and subsequent neutralization with mineral acid.

To reduce the bulk of the extract, concentration may be effected by passage through a centrifugal extractor or other commercially available counter-current separator and then extracted into an organic solvent which is subsequently removed. More simply the process may be carried out by direct removal of water in an atmosphere of oxygen-free steam in a vacuum evaporator. In both cases the concentration is carried out prior to the emulsification with the hop oil fraction.

An advantage of the invention is that, even assuming hop usage to be at or about the point of maximum utilization, hop usage can be reduced by up to 50%.

A further advantage is that the hop oil components in the finished beer can be made to duplicate that obtained by conventional hopping or be altered at will to improve or change the character and aroma. This has not been possible with conventional hopping.

A still further advantage of the invention is that it is not necessary for the manufacturer of beer to be as selective in his choice of hops. That is, it is now common practice for brewers to use hops of low $\alpha$-acid content because of the particular character they impart to their particular beer. As all the hops contain more than sufficient oil and in general do not vary in their individual components but only in the relative amounts of these components, it is possible using the process of this invention to obtain identical extracts from different hop varieties and it follows then that the use of such a process enables the user to use only hops with the high $\alpha$-acid content, thereby achieving considerable additional savings.

Further there is evidence to suggest that the utilization of the $\beta$-soft resins is greater when using a hop concentrate as above described compared with conventional brewing. It is a known fact that the $\beta$-resins and their transformation products are bitter.

Beer and the like produced by means of this invention can be made more stable as regards chill haze by not adding to the wort the particular anthocyanogens from hops which are at least in part responsible for chill haze in the resultant beer.

It is believed that barley anthocyanogens are in part responsible for the formation of chill haze in resultant beers. By the use of a hop concentrate as proposed in this invention the wort is boiled without hops as in conventional boiling resulting in the precipitation of a greater quantity of barley anthocyanogens than is normal, again resulting in a beer of increased stability.

By the use of a hop concentrate as proposed in this invention the time of wort boiling can be reduced considerably, achieving economy in steam usage.

The use of a hop concentrate as proposed in this invention is particularly applicable to the continuous production of hopped wort.

We claim:

1. A process for the production of a hop concentrate for use in the manufacture of a hopped beverage, which includes the steps:
   (a) extracting hops by refluxing with an organic solvent selected from the group consisting of petroleum fractions of boiling range between 40° C. and 60° C. and trichloroethylene, to form a crude hop-extract,
   (b) evaporating off all the solvent under vacuum to obtain a crude hop concentrate,
   (c) separating the total volatile oil content of the hops from the non-volatile resin by steam distilling the crude hop concentrate with live steam to remove said oils from said resins and retaining said oils and said resin residue,
   (d) subjecting the total hop-oils obtained from step (c) to vacuum fractional distillation to remove therefrom low boiling esters and carbonyl compounds and hydrocarbons which give rise to an undesirable taste and flavor in beer and collecting the remaining fractions of the hop oil consisting of terpene and sesquiterpene type materials which possess a taste characteristic suitable for flavouring and for bittering of beer,
   (e) isomerizing the humulones of hop-resins,
   (f) concentrating the isomerized resin phase by vacuum distillation to produce an isomerized hop-resin concentrate,
   (g) blending the selected hop-oil fractions collected from the fractional distillation of the total hop oils with the isomerized hop resin concentrate to produce a blended hop concentrate final product, such product being specifically designed for addition subsequent to wort boiling either prior to fermentation or to the fermented and matured beer prior to final filtration.

2. A process for the production of a hop concentrate for use in the manufacture of a hopped beverage, which includes the steps:

(a) extracting hops by refluxing under an inert atmosphere at a temperature below 50° C. with an organic solvent selected from the group consisting of petroleum fractions of boiling range between 40° C. and 60° C. and trichloroethylene to form a crude hop extract, (b) evaporating off all the organic solvent under reduced pressure at a temperature below 65° C. in an evaporator which enables minimal residence time of the extract in the heating zone, to obtain a crude hop concentrate, (c) separating the total volatile-oil content of the hops from the non-volatile resins by steam distilling the crude hop concentrate with live steam while maintaining a temperature in the containing vessel between 15 and 30° C., to remove said oils from said resins and retaining said oils and said resin residue, (d) subjecting the total hop-oils obtained from step (c) to vacuum fractional distillation to remove therefrom low boiling esters and carbonyl compounds and hydrocarbons which give rise to an undesirable taste and flavor in beer and collecting the remaining fractions of the hop oil consisting of terpene and sesqui-terpene type material which possess a taste characteristic suitable for flavoring and for bittering of beer, (e) isomerizing the humulones of hop-resins by adding alkali to the resin residue of the steam distillation and heating, said alkali being selected from the group consisting of dilute sodium hydroxide and sodium carbonate solution, and when adding sodium hydroxide, adding a dilute sodium hydroxide solution continuously to the resin residue from steam distillation while flowing said residue through alternate zones of heating and chilling to ensure a minimal residence time of the heat sensitive humulones of the hop resins in the heating zone, thereby preventing decomposition of the humulones, and subsequently neutralizing with dilute mineral acid, and when adding sodium carbonate adding a dilute sodium carbonate solution to the residue from the steam distillation and refluxing under an inert atmosphere for a time insufficient to decompose the humulones, chilling and then neutralizing the alkaline isomerized hop resin phase with dilute mineral acid to obtain an isomerized resin phase, (f) concentrating the isomerized resin phase by vacuum distillation to obtain an isomerized hop-resin concentrate, (g) blending and emulsifying the selected hop-oil fractions collected from the fractional distillation of the total hop oils with the isomerized hop resin concentrate to produce a blended hop concentrate final product, such product being specifically designed for addition subsequent to wort boiling either prior to fermentation or to the fermented and matured beer prior to final filtration.

3. Process defined in claim 1, in which step (e) is effected by subjecting the hop-extract to electro-magnetic radiation.

4. Process defined in claim 1, in which step (e) is effected by adding an alkali to the resin residue of the steam distillation and heating.

5. Process defined in claim 4, in which the alkali is dilute sodium hydroxide solution and said solution is added substantially continuously to the resin residue of the steam distillation while flowing said residue through alternate zones of heating and chilling to ensure a minimal residence time of heat-sensitive humulones of the hop resin in the heating zone thereby preventing decomposition of the humulones.

6. Process as defined in claim 4 in which the alkali is dilute sodium carbonate solution and said solution is added to the hop residue from the steam distillation and the mixture is refluxed for a time insufficient to decompose the humulones.

7. Process as defined in claim 1 in which said blended hop concentrate final product is added to wort subsequent to boiling and prior to fermentation.

8. Process as defined in claim 1 in which said blended hop concentrate final product is added to fermented and matured beer prior to final filtration.

9. Process according to claim 2, in which step (e) comprises isomerizing the humulone resins into isohumulones by adding 10% sodium carbonate solution to the hop resin residue from step (c) until a pH of between 7 to 8 is attained while maintaining the residue under reflux, adding a further quantity of 10% sodium carbonate solution to the refluxing alkaline residue until a pH of between 8 and 11 is attained, and continuing refluxing of the solution to convert the humulone to the di-anion, chilling and neutralizing the solution to obtain an isomerized hop resin phase.

10. Process according to claim 2 in which step (e) comprises isomerizing the humulone resins into isohumulone resins by addition of cold pre-boiled 0.25% sodium hydroxide solution to the resin residue of step (c) until a pH between 8 and 9 is obtained, further adding 0.25% sodium hydroxide solution to the resin residue while flowing said residue through alternate zones of heating and chilling to ensure a minimal residence time of the heat-sensitive humulones of the hop resins in the heating zone thereby preventing decomposition of the humulones, said sodium hydroxide being added until the pH is between 10 and 11, and then subsequently neutralizing the alkaline isomerized hop resin phase with dilute hydrochloric acid to obtain an isomerized hop resin phase.

References Cited in the file of this patent
UNITED STATES PATENTS

| | | |
|---|---|---|
| 978,476 | Nilson | Dec. 13, 1919 |
| 1,800,632 | Horst | Apr. 14, 1931 |
| 2,816,032 | Heyer | Dec. 10, 1957 |
| 2,824,803 | Stark | Feb. 25, 1958 |
| 3,044,879 | Koch et al. | July 17, 1962 |